United States Patent [19]

Egner et al.

[11] Patent Number: 5,133,040
[45] Date of Patent: Jul. 21, 1992

[54] CLAMP FOR A TRANSITION OF A MULTIPLE FIBER CABLE

[75] Inventors: Walter A. Egner, Harrisburg; Steven P. Owens, Grantville, both of Pa.

[73] Assignee: AMP Incorporated, Harrisburg, Pa.

[21] Appl. No.: 651,720

[22] Filed: Feb. 6, 1991

[51] Int. Cl.⁵ .......................... G02B 6/00; G02B 6/36
[52] U.S. Cl. .................................................. 385/136
[58] Field of Search ..... 350/96.10, 96.15, 96.20–96.22

[56] References Cited

U.S. PATENT DOCUMENTS

| | | | |
|---|---|---|---|
| 3,332,053 | 7/1967 | Busler | 339/210 |
| 3,836,944 | 9/1974 | Lawson | 339/99 R |
| 4,247,163 | 1/1981 | Lumpp et al. | 350/96.21 |
| 4,824,204 | 4/1989 | Pafford | 350/96.21 |
| 4,826,277 | 5/1989 | Weber et al. | 350/96.23 |
| 4,834,487 | 5/1989 | Abendschein et al. | 350/96.20 |

Primary Examiner—Akm E. Ullah
Attorney, Agent, or Firm—Gerald G. Kita

[57] ABSTRACT

A clamp comprising; two sections 12, 12 hinged together for closure toward each other and onto an exterior of a divisible, multiple fiber cable 2, friction surfaces 24, 24 of the sections 12, 12 are adapted for engaging along an exterior of a first portion 25 of the multiple fiber cable 2, and the exteriors of tubing 27, 27 extending over single optical fibers 3, 3 that project from the multiple fiber cable 2.

9 Claims, 3 Drawing Sheets

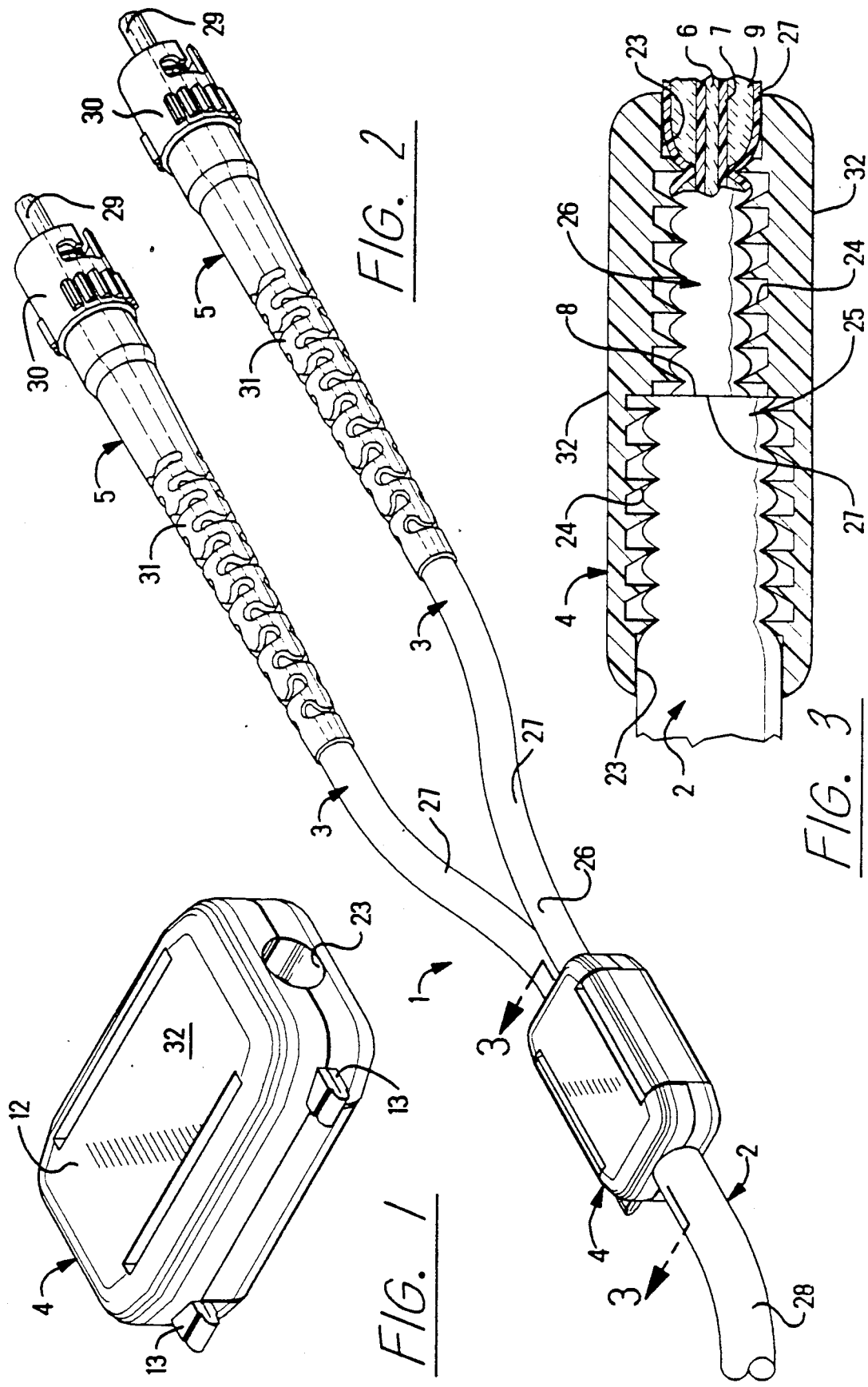

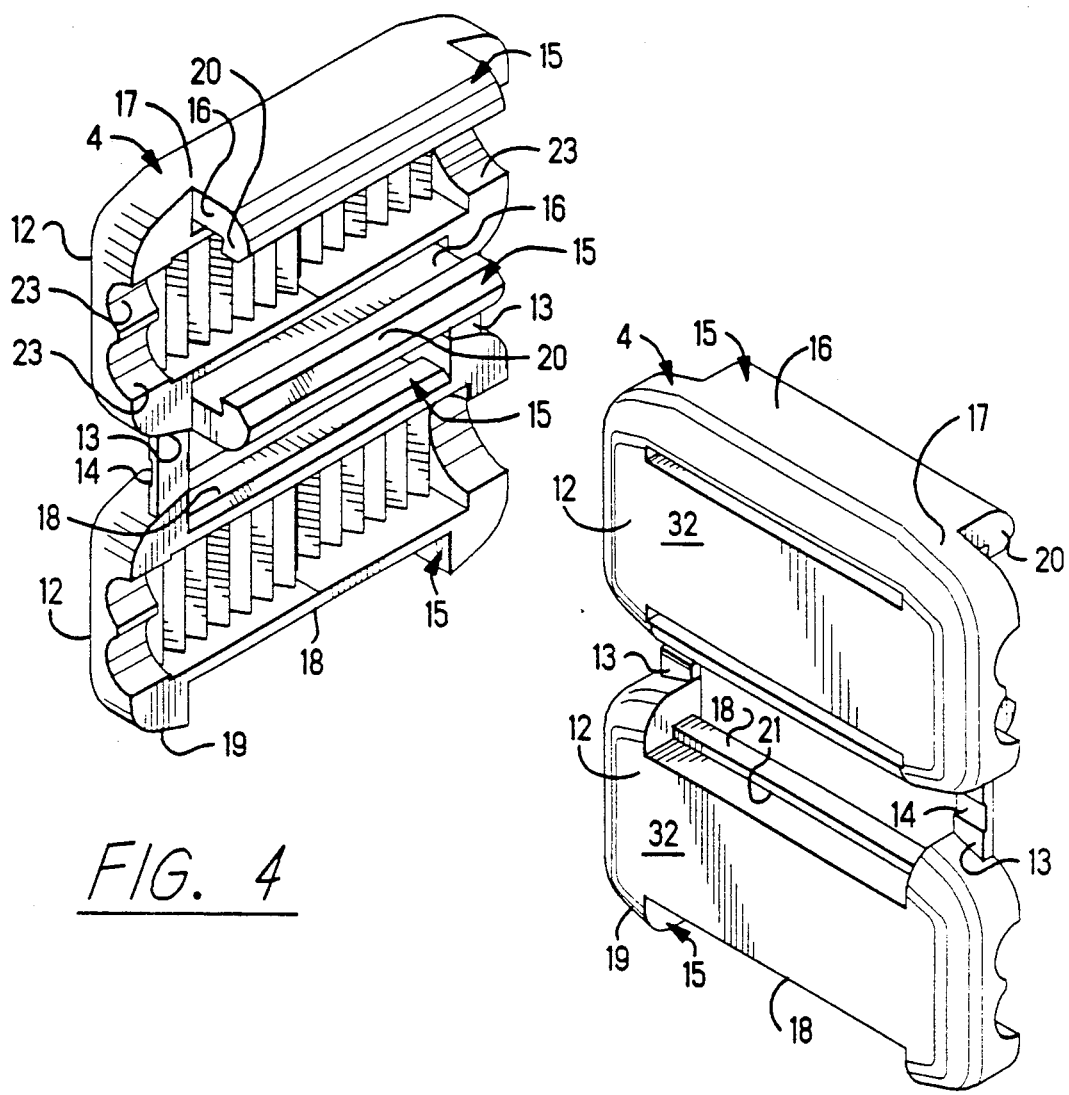
FIG. 4
FIG. 5
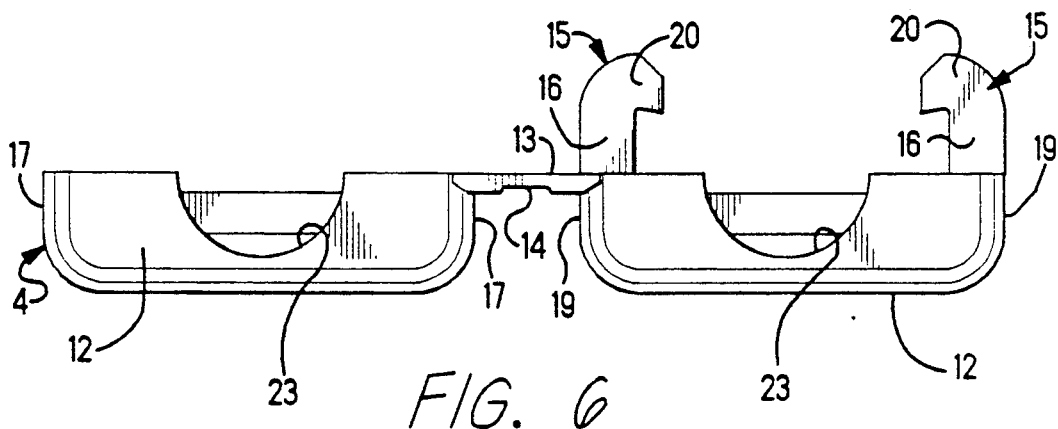
FIG. 6

CLAMP FOR A TRANSITION OF A MULTIPLE FIBER CABLE

FIELD OF THE INVENTION

The invention relates to a transition of a multiple fiber cable to single fiber cable, and more particularly, to division of a multiple fiber cable into single fiber cables.

BACKGROUND OF THE INVENTION

Multiple fiber cable is constructed with two optical fibers that provide two separate paths of communication for transmitting optical signals. A sheath of the cable encloses the two optical fibers. According to one form of cable construction, the cable includes a sheath that must be removed to uncover the two optical fibers. There is known in U.S. Pat. No. 4,826,277, a transition of a multiple fiber cable to a single fiber cable. Such a transition is adapted for assembly with optical fibers that have been uncovered by removing corresponding portions of the cable. Then the optical fibers are covered by corresponding, auxiliary sheaths. Then corresponding strain relief members are assembled to the optical fibers. Then a shell is assembled for holding the strain relief members in place.

SUMMARY OF THE INVENTION

The invention is a cover clamp that is constructed for assembly on a multiple fiber cable without the use of a tool. The clamp is constructed with sections capable of assembly by hand onto the cable, and capable of interlocking to each other. Accordingly, a clamp comprises, two sections hinged together for closure toward each other and onto an exterior of a multiple fiber cable, frictional surfaces along interior facing surfaces of the sections being adapted for engaging along an exterior of a first portion of the multiple fiber cable, and on the exterior of at least one single fiber cable while an optical connector is assembled to a corresponding single fiber cable.

The invention further resides in a method for constructing a transition of a multiple fiber cable to single fiber cable involving, extending at least one unsheathed optical fiber and a group of multiple strength members of a multiple fiber cable from a remainder of the multiple fiber cable, inserting the optical fiber and the group of strength members along an interior of hollow tubing, and clamping and enclosing and end of the multiple fiber cable and an end of the hollow tubing with a clamping enclosure.

U.S. Pat. No. 3,332,053 discloses a known cover having hinged sections that close together to enclose an electrical contact and a portion of an electrical wire, after the contact has been connected to the wire. According to U.S. Pat. No. 3,836,944, a known cover has hinged sections that close together to insert a pair of insulated wires into slots of an electrical contact, and to cover the contact and portions of the wires. The contacts penetrate the insulation covering the wires, and also the wires, to apply force at the points of engagement with the wires, which force is retained as necessary for reducing electrical resistance to the flow of electricity across the points of engagement.

By contrast, optical fibers that are stressed by deformation or by curvature exceeding a tolerable, minimum curvature in the fibers will cause attenuation of optical signals. Thus, optical fibers must avoid deformation beyond a tolerable or allowable limit and curvature exceeding a tolerable or allowable, minimum curvature.

According to a feature of the present invention, the cover clamp applies gripping forces on a multiple fiber cable by noninvasive deformation of the cable exterior, whereby deformation is incurred by the cable to absorb the brunt of gripping forces, and such deformation is substantially restricted to an outer jacket and strength members of the cable, and harmless amounts of deflection and bending are incurred by the buffer covered optical fibers within the interior of the cable.

For an understanding of the invention, reference will now be made by way of example to a following detailed description in conjunction with accompanying drawings.

DESCRIPTION OF THE DRAWINGS

FIG. 1 is an enlarged perspective view of a closed clamp.

FIG. 2 is an enlarged perspective view of a transition of a multiple fiber cable to single fiber cable, together with a clamp as shown in FIG. 1.

FIG. 3 is a section view taken along the line 3—3 of FIG. 2.

FIG. 4 is an enlarged perspective view of an open clamp, illustrating interior surfaces.

FIG. 5 is an enlarged perspective view of an exterior of the clamp as shown in FIG. 4.

FIG. 6 is a front view of an open clamp.

With reference to FIG. 1, a transition 1 of a multiple fiber cable 2 to single fiber cables 3, 3 comprises, a clamp 4 applied to the multiple fiber cable 2, and corresponding optical connectors 5, 5 applied to the single fiber cables 3.

With reference to FIG. 3, construction of the cable 2 will now be discussed. The cable 2 includes two optical fibers 6, 6 and two cylindrical buffers 7, 7 concentric with corresponding optical fibers 6, 6. A polymeric, hollow outer sheath 8 encircles multiple strands of strength members 9, for example, multiple strands of KEVLAR, a trademark of E. I. Du Pont de Nemours & Company, Wilmington, Del., U.S.A. The strength members 9 are distributed in a cylindrical space between the sheath 8 and a corresponding buffer 7. The sheath 8 forms an exterior of the cable 2.

With reference to FIGS. 4, 5 and 6, the clamp 4 is of unitary plastics construction, formed by molding, for example, with two sections 12, 12 hinged together by hinges 13, 13 formed by strips that are readily doubled back on themselves along corresponding grooves 14, 14 that provide corresponding fold lines across the strips. When the two sections 12, 12 are closed toward each other, FIG. 1, each of interlocking portions 15, 15, in the form of a latch bar 16 extending from a side 17 of a first one of the sections 12, 12, and a corresponding catch groove 18 on a side 19 of a second one of the sections 12, 12, hold the sections 12, 12 interlocked together. Each of the latch bars 16 has a turned end 20 to interlock against a shoulder 21 of one of the grooves 18. Each of the latch bars 16 is resiliently deflectable for being cammed outwardly by, and to glide over, a surface of the catch groove 18 and move past the shoulder 21, and then, to pivot inwardly to catch against the shoulder 2 and resist separation of the sections 12, 12.

Figure 7:
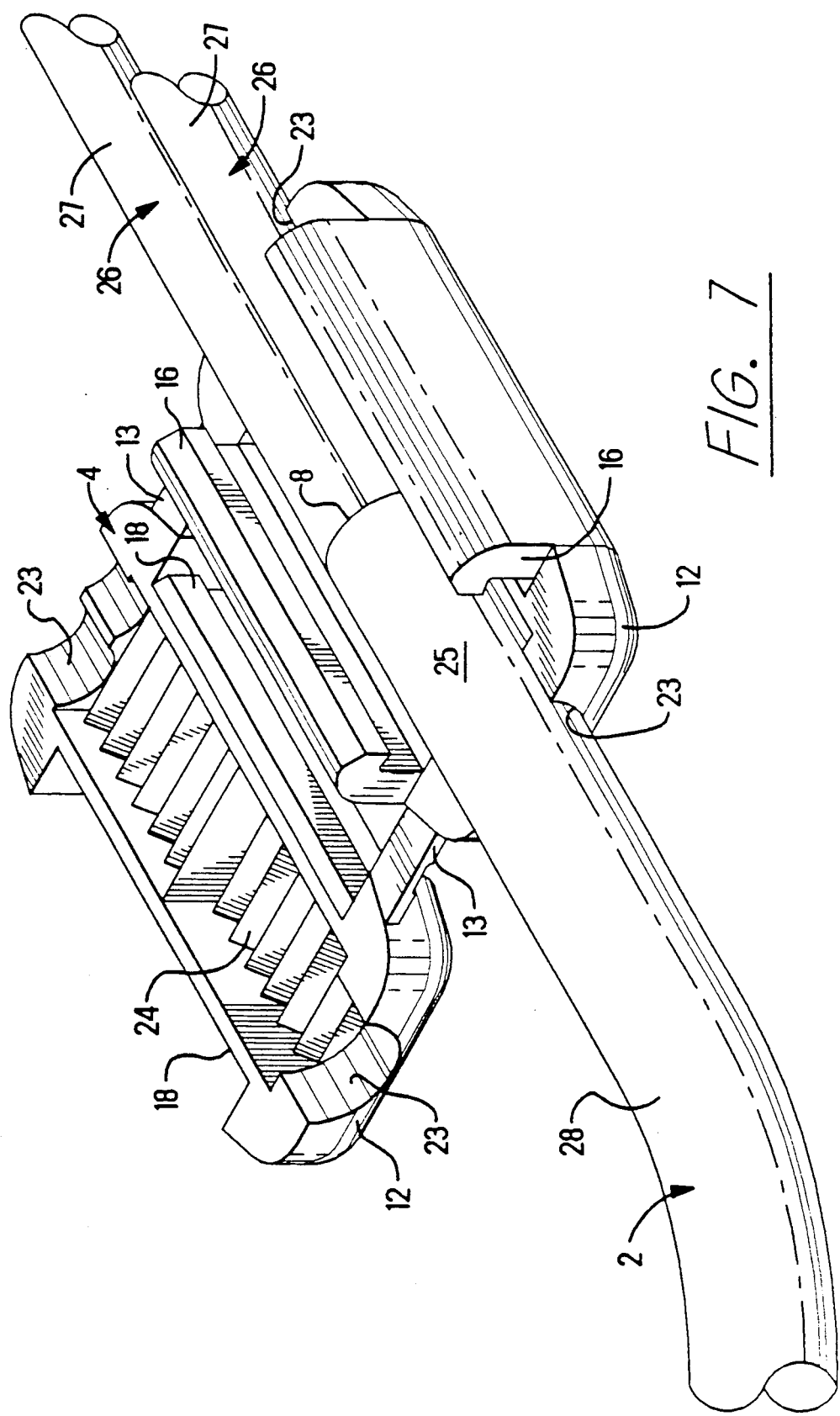
FIG. 7 is an enlarged perspective view of an open clamp being assembled to a multiple fiber cable.

Interior surfaces 22, 22 of the sections 12, 12 include recessed entryways 23, 23 along opposite edge margins of the sections 12, 12. The entryways are semi-cylindrical in shape to conform to the exterior of the multiple fiber cable 2. The interior facing surfaces 22, 22 further include friction surfaces 24, 24 in the form of a series of projecting ridges. The ridges are between the entryways 23, 23 and extend transversely of the entryways 23. 23. When the sections 12, 12 close toward each other, the entryways 23, 23 face and oppose one another, and engage the exterior of the multiple fiber cable 2. The ridges of the sections 12, 12 face and oppose one another and engage the exterior of the cable 2.

The transition 1 is constructed as will be described with reference to FIGS. 2 and 7. With reference to FIG. 7, a first portion 25 of the multiple fiber cable 2 is laid to extend through corresponding entryways 23, 23 on one of the sections 12, 12, and across a corresponding frictional surface 24.

Attenuation of optical signals carried by the optical fibers 6, 6 would result from deformation and bending of the optical fibers 6, 6 beyond tolerable or allowable limits. An advantage of the invention is, that the clamp 4 is applied only to the exterior of the cable 2, and applies compression force to grip the cable 2 by noninvasive deformation of the cable 2. Noninvasive deformation avoids excessive bending or deformation of the optical fibers 6, 6. Compression force is absorbed by the buffers 7, 7 and the optical fibers 6, 6. The buffers 7, 7 and the fibers 6, 6 remain substantially cylindrical, because the compression force absorbed by them is lower than that required to deform the buffers 7, 7 and the fibers 6, 6 from their substantially cylindrical shapes. Further, the buffers 7, 7 and the optical fibers 6, 6 extend substantially straight through the clamp 4 without excessive bending.

Second portions 26, 26 of the cable 2 are split apart, for example, as shown in FIGS. 3 and 7, by cutting and removing a portion of the outer sheath 8 from corresponding projecting portions of, the optical fibers 6, 6, the buffers 7, 7 and the strength members 9. The projecting optical fibers 6, 6, are covered with corresponding, projecting buffers 7, 7 and are spread apart from each other. The projecting strength members 9 are divided into two groups. Each group of strength members 9 accompanies a corresponding buffer 7 and corresponding fiber 6 projecting from the cut away sheath 8. Then a corresponding buffer 7 and corresponding fiber 6 and a corresponding group of strength members 9 are inserted into and along hollow tubing 27. Each of the fibers 6, 6 and corresponding buffers 7, 7 and groups of strength members 9 are inserted into and along hollow tubing 27, 27. The tubing 27, 27 are moved along the structure described until ends of the tubing 27, 27 oppose closely a cut off end of the sheath 8, FIGS. 3 and 7.

The first portion 25 of the multiple fiber cable 2 and the second portions 26, 26 are held together by the clamp 4. The first portion 25 of the multiple fiber cable 2 remains unsplit apart. The clamp 4 holds closely together the corresponding exteriors and ends of the sheath 8 and the tubing 27, 27. A third portion 28 of the multiple fiber cable 2 extending from the first portion 25 remains unsplit. The split apart, second portions 26, 26 of the cable 2 provide two, single fiber cables 3, 3. Each of the single fiber cables 3 has one optical fiber 6, concentric with a buffer 7 and strength members 9 and enclosed by a corresponding tubing 27 that forms a sheath. The component parts of the newly constructed single fiber cables 3, 3 are thereby secured and capable of being assembled with a corresponding, known optical connector 5 having an alignment ferrule 29, a coupling nut 30 and a strain relief boot 31. Further details of the known optical connector 5 and its assembly with an optical fiber are disclosed, for example, in U.S. Pat. No. 4,834,487. The clamp 4 is assembled on the exterior only of the first portion 25 of the multiple fiber cable 2, for holding the first portion 25 together while the second portions 26, 26 are split apart and individually treated as single fiber cables 3, 3 and while optical connectors 5, 5 are assembled with the single fiber cables 3, 3.

Each of the entryways 23, 23 on opposite edge margins of the sections 12, 12 has two semicylindrical shapes, side by side, to conform to the exteriors of the two single fiber cables 3, 3. Selected portions of the two cables 3, 3 are selected to be held together in the clamp 4. These selected portions of the two cables 3, 3 are laid to extend through corresponding semicylindrical shapes of the entryways 23, 23 along opposite edge margins of one section 12, and across the corrresponding frictional surface 24 of the one section 12. The sections 12, 12 are closed together, and are latched, to cover the selected portions of the two, single fiber cables 3, 3. The cables 3, 3 are held by the clamp, while the single sheath 8 of the cable 2 of larger circumference is held by the clamp 4 in a corresponding, single, enlarged circumference entryway 23, defined in part along opposite edge margings of the sections 12, 12. The clamp 4 is used to hold two, single fiber cables 3, 3 together at their selected portions. These selected portions can be located at even, or uneven, distances from the ends of the single fiber cables 3, 3.

The sections 12, 12 are closed together, and are latched to cover the first portion 25 of the multiple fiber cable 2, FIGS. 2 and 7. With particular reference to FIG. 7, the friction surfaces 24, 24, when the sections 12, 12 are closed, compress the multiple fiber cable 2 and the second portions 26, 26, and deform inwardly the outer sheath 8 and the tubing 27, 27 without invasive penetration of the sheath 8. The space in the interior of the sheath 8 forms a non-cylindrical, flattened space for the strength members 9 to reside. Compression applied by the sections 12, 12 displaces the strength members 9, causing them to become redistributed to new positions in the flattened space 10. The friction surfaces 24, 24 grip the multiple fiber cable 2 and restrain the clamp 4 from movement. An important advantage of the invention resides in the exterior surfaces 32, 32 of broad area of the sections 12, 12 upon which human finger pressure is applied to close and latch together the sections 12, 12 together in engagement with the cable 2. Thus, only finger pressure is required, without the need for a tool.

We claim:

1. A method for providing a transition of a multiple fiber cable to single fiber cable, comprising the steps of:
   extending uncut at least one unsheathed optical fiber and a group of multiple strength members of a multiple fiber cable from a remainder of the multiple fiber cable,
   inserting the optical fiber and the group of strength members extending uncut from the multiple fiber cable along an interior of hollow tubing, and
   clamping and enclosing an end of the multiple fiber cable and an end of the hollow tubing with a clamping enclosure.

2. A method as recited in claim 1, further comprising the step of, preventing progressive advance of a split along the cable by mounting the clamp on the exterior only of the multiple fiber cable.

3. A method as recited in claim 1, further comprising the step of; interlocking the sections together.

4. A clamp comprising; two sections hinged together for closure toward each other and onto an exterior of a divisible, multiple fiber cable, frictional surfaces along interior facing surfaces of the sections adapted for engaging along an exterior of a first portion of the multiple fiber cable, the clamp covering the exterior for holding the first portion together, single optical fibers of the multiple fiber cable extending uncut along corresponding tubing and optical connectors on the single optical fibers.

5. A clamp as recited in claim 4, wherein the frictional surfaces extend across longitudinally extending optical fibers of the cable and a longitudinally extending groove of the cable.

6. A clamp as recited in claim 4, and further comprising:
interlocking portions of the two sections retain the two sections clamped on the cable.

7. A clamp as recited in claim 4, wherein the frictional surfaces are serrations.

8. A clamp as recited in claim 4, wherein a third portion of the cable extends unsplit from the first portion.

9. A method for using a clamp of the type as recited in claim 4, comprising the steps of:
laying two, single fiber cables through corresponding entryways of one of the sections and over the corresponding frictional surace of said one of the sections,
closing the two sections of the clamp together until the two sections latch together, whereby portions of the two, single fiber cables are covered by the clamp, and are held together in the clamp.

* * * * *